United States Patent
Viaud

(10) Patent No.: US 8,028,499 B2
(45) Date of Patent: Oct. 4, 2011

(54) BALE WRAPPER

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 234 days.

(21) Appl. No.: 12/416,195

(22) Filed: Apr. 1, 2009

(65) Prior Publication Data

US 2009/0249746 A1    Oct. 8, 2009

(30) Foreign Application Priority Data

Apr. 2, 2008 (EP) .................................. 08103327

(51) Int. Cl.
*B65B 13/02* (2006.01)
*A01D 41/127* (2006.01)

(52) U.S. Cl. .................. 53/399; 53/441; 53/52; 53/587; 100/4; 56/10.2 R

(58) Field of Classification Search .............. 53/399, 53/441, 461, 52, 556, 588, 203, 218; 100/4, 100/5; 56/10.2 J, 10.2 R
See application file for complete search history.

(56) References Cited

U.S. PATENT DOCUMENTS

| | | | | |
|---|---|---|---|---|
| 3,693,316 A * | 9/1972 | Schmermund | ..................... | 53/52 |
| 4,683,704 A * | 8/1987 | Vorachek et al. | ............... | 53/461 |
| 5,680,747 A * | 10/1997 | Spatafora et al. | ............... | 53/477 |
| 5,946,884 A * | 9/1999 | Nordstrom et al. | ............. | 53/225 |
| 5,979,146 A * | 11/1999 | Orpen et al. | ..................... | 53/441 |
| 6,092,789 A * | 7/2000 | Christopher et al. | ......... | 254/274 |
| 6,705,060 B1 * | 3/2004 | McGuinness et al. | .......... | 53/409 |
| 6,966,162 B2 * | 11/2005 | Viaud et al. | ........................ | 53/64 |
| 7,222,626 B2 * | 5/2007 | Focke et al. | ................... | 131/283 |
| 7,694,491 B2 * | 4/2010 | Noonan et al. | .................. | 53/211 |
| 2003/0089081 A1 * | 5/2003 | Platon | ............................. | 53/399 |
| 2004/0231298 A1 * | 11/2004 | Focke et al. | ..................... | 53/461 |
| 2009/0107102 A1 * | 4/2009 | Biziorek | ......................... | 56/341 |

FOREIGN PATENT DOCUMENTS

| | | |
|---|---|---|
| EP | 0829197 | 3/1998 |
| EP | 1186225 | 3/2002 |
| GB | 2159489 | 12/1985 |

* cited by examiner

*Primary Examiner* — Paul Durand

(57) ABSTRACT

A bale wrapper is provided that comprises a rotating arm holding a film dispenser. The arm rotates around an axis thereby wrapping the film from the film dispenser around the bale. Rotation of the arm is stopped when a sensing arrangement mounted ahead of the arm senses an obstacle. The arm is driven with a first speed sufficiently slow to prevent any risk of injury and the arm and the film dispenser from being damaged by hitting an obstacle detected by the sensing arrangement when an obstacle sensor observing a sensitive range in the environment of the bale wrapper detects an obstacle. The arm rotates at a second speed faster than the first speed when the obstacle sensor detects no obstacle.

6 Claims, 3 Drawing Sheets

BALE WRAPPER

FIELD OF THE INVENTION

The present invention relates to a bale wrapper having at least one arm holding a film dispenser, and a drive arrangement for rotating the arm around an axis in a direction of rotation and thereby wrapping the film from the film dispenser around a bale. A sensing arrangement is mounted in the direction of rotation ahead of the arm and is arranged to stop rotation of the arm when the sensing arrangement senses an obstacle. The drive arrangement is operable to drive the arm with a first speed sufficiently slow to prevent the arm and the film dispenser from getting damaged by hitting an obstacle detected by the sensing arrangement. The invention further relates to a corresponding method for wrapping a bale.

BACKGROUND OF THE INVENTION

Bale wrappers are used in agriculture to wrap bales with films of impervious material such as plastic, to envelop the baled material in an airtight manner for the process of ensilage of fodder. The plastic is wrapped by rotating the bale around its horizontal axis, while either the bale, as disclosed in GB 2 159 489 A, or an arm carrying the wrapping material, as disclosed in EP 0 829 197 A and EP 1 186 225 A, is rotated simultaneously around a vertical axis. Such wrappers are typically mounted on a common frame with a baler as disclosed in EP 1 186 225 A or embodied as independent machines connected to a tractor for transporting either the wrapper to the respective bales lying on a field or the bales to the wrapper as disclosed in EP 0 829 197 A and GB 2 159 489 A.

In order to prevent accidents, wrappers with rotating arms are usually protected by mechanical sensing arrangements in the form of light secondary arms running ahead of the main arms holding the film dispensers. Once one of the secondary arms comes in contact with an obstacle, it tilts back and activates a braking mechanism that stops the main arms before they hit the obstacle. This safety system is however only reliable within a certain speed range and thus limits the rotational speed of the arms and the working speed of the entire wrapper. When the wrapper is used in combination with a baler, the time required for wrapping the bale is, however, critical for the throughput of the combination.

It has been proposed to provide a self-propelled, unmanned autonomous wrapper with safety devices for avoiding accidents (DE 196 08 014 A). The safety devices comprise mechanical sensing rods and infrared sensors for detecting organisms and engines based upon the generated heat. If, for example, the wrapper comes closer than 20 m to a tractor/baler combination operating on the same field, detected by means of positioning systems, the wrapper is automatically switched off, until this distance is exceeded again. It should however be mentioned that presence sensors like those proposed in DE 196 08 014 A suffer from the disadvantage that they detect all kind of obstacles such as bales lying in the field, trees or fences, and thus often lead to unintended interruptions of work.

SUMMARY OF THE INVENTION

It is therefore an object of the present invention to provide a bale wrapper that is capable of wrapping the bale with a sufficient high speed, but assures an appropriate level of safety.

Accordingly a bale wrapper is provided that comprises one, two, three or more arms. The arms each holding a film dispenser and being connected to a drive arrangement such that they can rotate around an axis in a direction of rotation and thereby wrap the film from the dispenser around a bale to be wrapped. A sensing arrangement is mounted in the direction of rotation ahead of the arm and stops the rotation of the arm once the sensing arrangement interacts with an obstacle. Further, at least one obstacle sensor is provided that observes a sensitive zone in the environment of the bale wrapper. The obstacle sensor is connected to the drive arrangement. In the event that the obstacle sensor detects an obstacle within the sensitive zone, the arm is driven with a first speed. The first speed is sufficiently slow such that the sensing arrangement is working in the intended manner. Thus, once an obstacle is encountered by the sensing arrangement, no risk of injury will occur and the arm and the film dispenser will not be damaged by hitting the obstacle. Preferably, the first speed is slow enough that the arm and the film dispenser will not touch the obstacle at all. The arm is driven with a second speed faster than the first speed when the obstacle sensor detects no obstacle.

Thus, the wrapper will work with a relatively high speed of the arms as long as the obstacle sensor detects no obstacle in the environment of the bale wrapper. On the other hand, if the obstacle sensor detects an obstacle, the speed is reduced to the first speed allowing the sensing arrangement to stop the arm without any damage to the arm and ribbon dispenser and harm to the obstacle if necessary. The present invention hence decreases the wrapping time without negatively influencing safety.

The obstacle sensor can be a distance sensor, in particular a microwave sensor and/or radar sensor and/or ultrasonic sensor and/or a scanning laser sensor. The obstacle sensor can also be an infrared sensor. In another embodiment or additionally to the distance sensor, the obstacle sensor comprises a two or three dimensional camera and an image processing system.

BRIEF DESCRIPTION OF THE DRAWINGS

A preferred embodiment of the invention will be described below with reference to the accompanying drawings wherein.

DESCRIPTION OF THE PREFERRED EMBODIMENT

Figure 1:
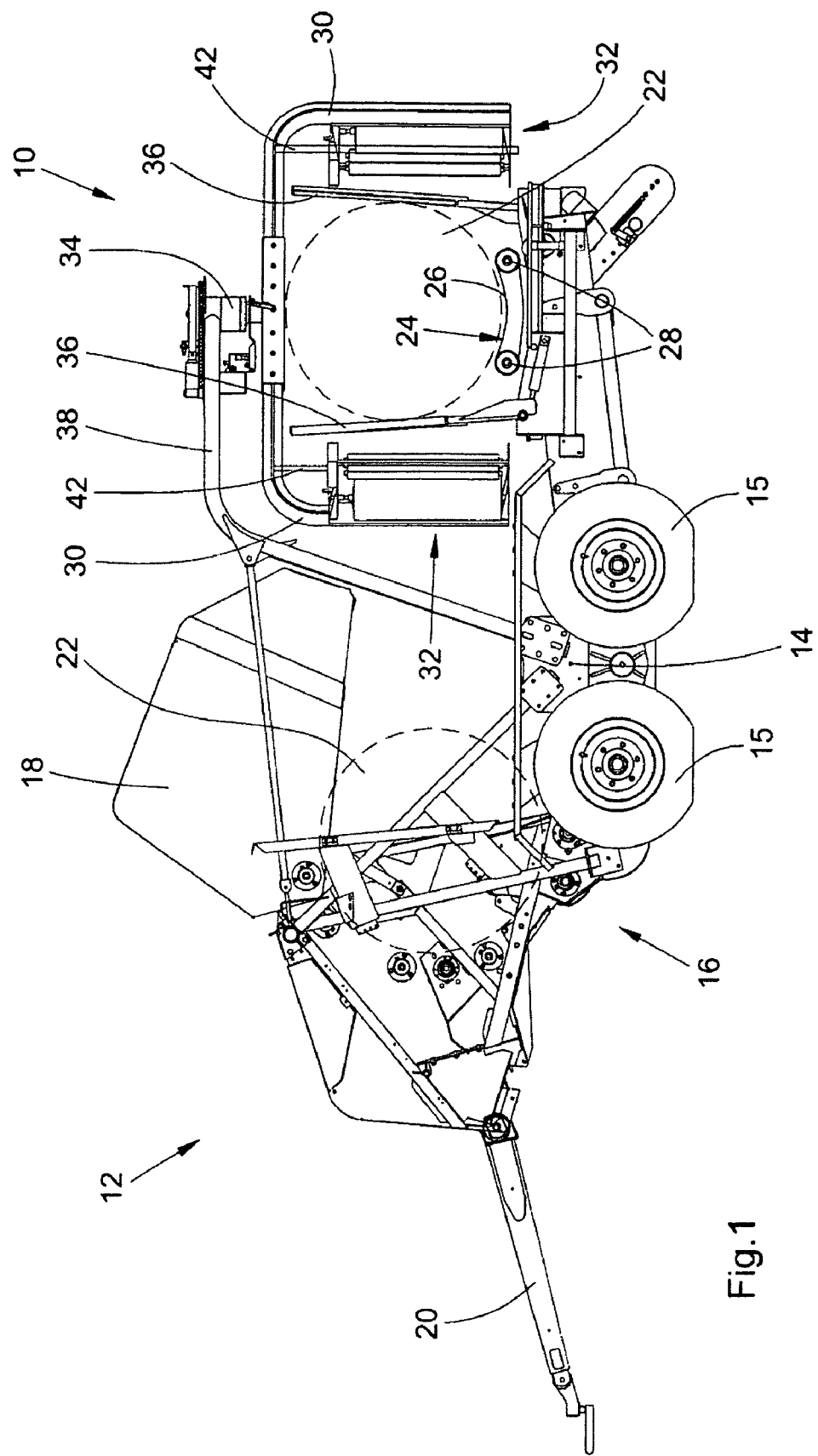
FIG. 1 is a lateral view of a bale wrapper.

With reference now to the drawings it can be seen that FIG. 1 shows a side view of a bale wrapper 10 that is provided as a part of a baler/wrapper combination 12. The latter comprises a frame 14 supported on wheels 15. The frame 14 supports a baler 16 with a rear door 18 and the bale wrapper 10. In operation the baler/wrapper combination 12 is pulled behind a tractor (not shown) by a tongue as described in detail in EP 1 186 225 A, the contents of which are incorporated herein by reference. It should be mentioned that the present invention is not restricted to a baler/wrapper combination 12, because the bale wrapper 10 could be provided as an independent machine, coupled directly to a tractor for driving the bale wrapper 10 to the bales lying on a field, or transporting the bales to the bale wrapper 10. The bale wrapper 10 could also be a self-propelled unit, manned or unmanned.

A bale 22 produced in the baler 16 is transported by a movable table 24 from the baler 16 to a wrapping position in the bale wrapper 10. During the wrapping operation, the bale 22' to be wrapped is thus lying on the table 24 that comprises a belt 26 surrounding two rollers 28. Above the table 24, two opposite arms 30 having orthogonal vertical and horizontal sections surround the bale 22'. Each vertical section of the arms 30 supports a film dispenser 32. The inner ends of the horizontal sections of the arms 30 are connected to a drive arrangement 34 operable to rotate the arms 30 around a vertical axis. The drive arrangement 34 is connected to the frame 14 by a support frame 38 and comprises a hydraulic motor coupled to the hydraulic-system of the tractor. During operation, the drive arrangement 34 (or a separate hydraulic motor) is also driving the rollers 28, such that the bale 22' is rotating around its horizontal center axis, while the arms 30 rotate around the bale 22' and film is unwound from the film dispensers 32 and wrapped around the bale 22'. Film holders 36 press the film against the bale 22' during the start of the wrapping operation and cut it off after the wrapping process. The speeds of the arms 30 and of the rollers 28 can, but need not be, synchronized to obtain a desired positioning of the film 52 on the bale 22'.

Figure 2:
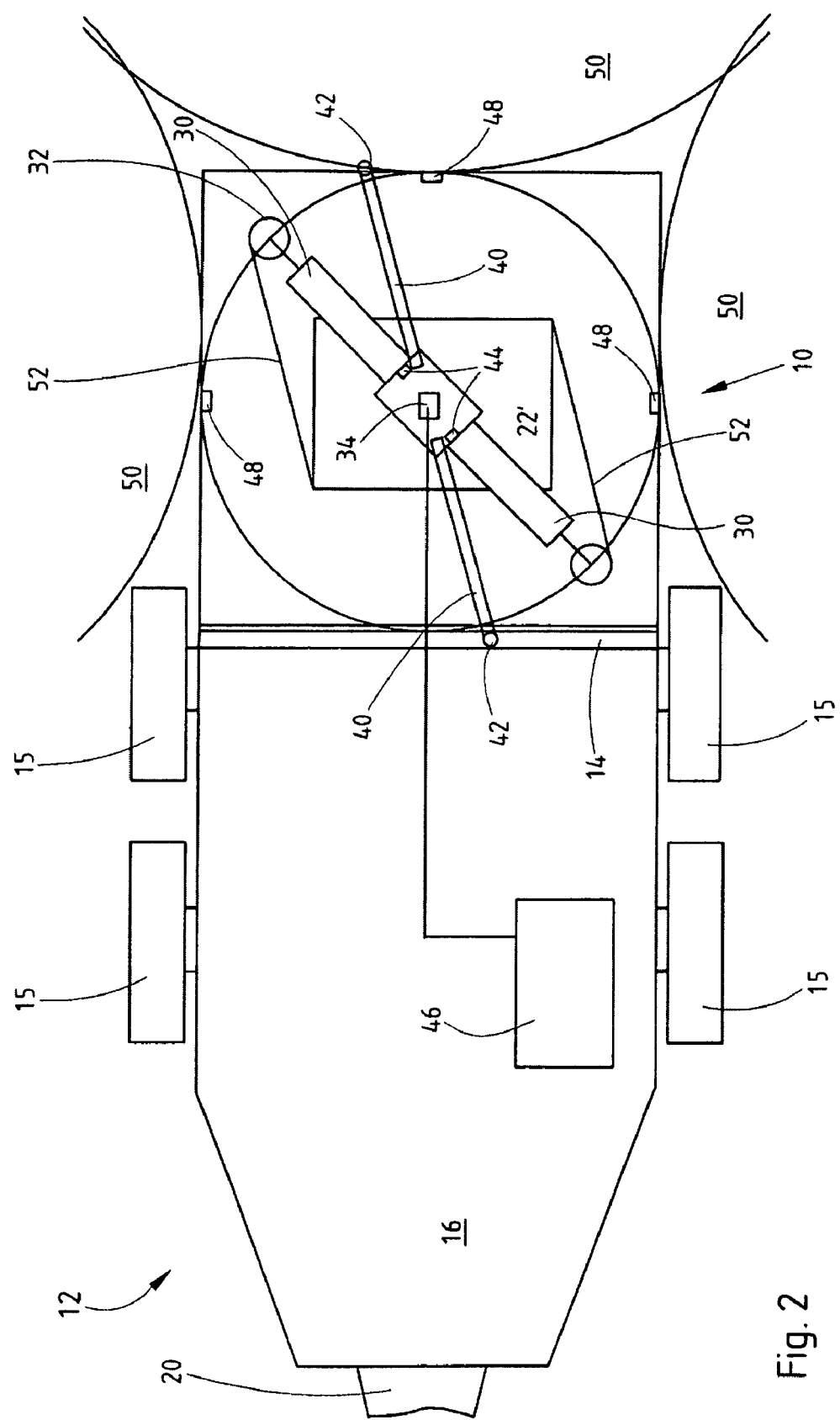
FIG. 2 is a top view of the bale wrapper of FIG. 1.

A top view of the baler/wrapper combination 12 is shown in FIG. 2. Here it can be seen that the arms 30 and the film dispensers 32 are protected by a sensing arrangement comprising horizontal bars 40 and vertical rods 42 mounted to the outer ends of the bars 40 and extending downward to the height of the table 24. The bars 40 and rods 42 are mounted ahead of the arms 30 with respect to the direction of rotation of the latter, which is, in FIG. 2, in the clockwise direction. The bars 40 are mounted pivotally around the vertical axis to the adjacent arms 30 and spring-biased into the shown rest position. Sensors 44 detect the angular position of the bars 40 with respect to the arms 30. The sensors 44 comprise a potentiometer or inductive switch or a magnetic sensor and a magnet or any other suitable device for detecting the angular position of the bar 40 with respect to the adjacent arm 30. The sensors 44 are connected by wires (preferably a bus), or via a wireless connection, to a controller 46 that controls the speed of the drive arrangement 34. It should be noted that the mechanical sensing arrangement with bars 40, rods 42 and sensors 44 shown can be replaced with a contactless sensing arrangement, which could for example comprise a light barrier or a laser distance measuring device looking downward from a position ahead of the arm 30 to detect the presence of obstacles.

Additional obstacle sensors 48 are mounted to the frame 14 at both sides of the bale wrapper 10 and at its rear. The obstacle sensors 48 have overlapping sensitive ranges 50 that extend to a distance lying in the order of 1 to 10 m from the wrapper 10. The sensitive ranges 50 of the obstacle sensors 48 cover the entire area through which an obstacle, like a human being, could approach the bale wrapper 10. The obstacle sensors 48 can make use of any suitable technology, for example microwaves, radar, ultrasound, or infrared light, or could comprise a scanning laser sensor detecting the time of flight. The obstacle sensors 48 could also comprise a camera and an image processing system. The obstacle sensors 48 are connected to the controller 46. The controller 46 is also suited to control the baling operation (e. g. opening and closing of the door 18 and positioning the table 24 between a forward loading position and a rear baling position).

Figure 3:
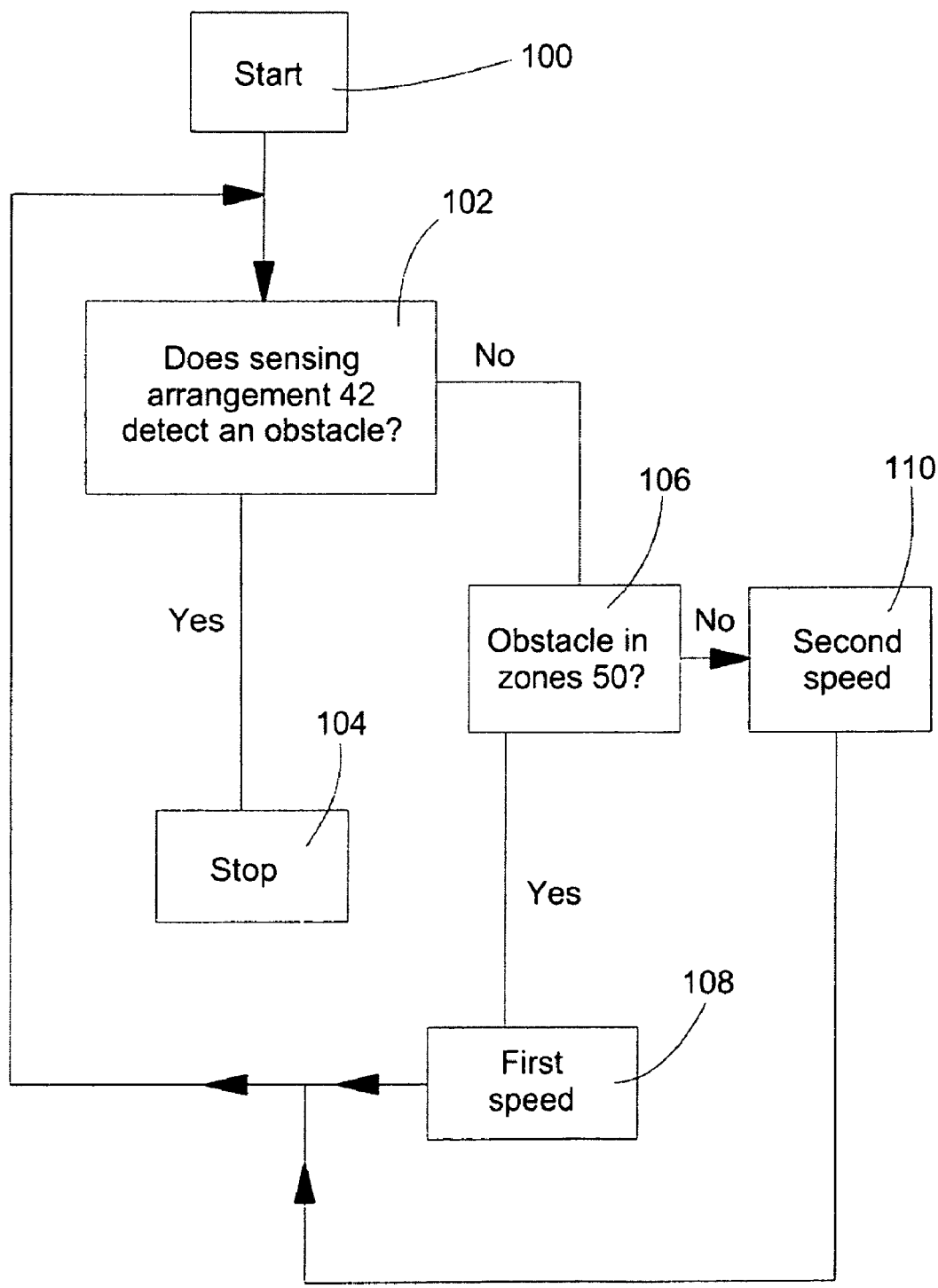
FIG. 3 is a flow diagram according to which the controller in FIG. 2 works.

FIG. 3 illustrates the logic employed by the controller 46. After a bale 22 is built in the baler 16, it is wrapped with a net or twine, and then the door 18 opens. The table 24 is then brought to a forward loading position, in which it receives the bale 22, which is in turn unloaded from the baler 16 by gravity or action of rollers or belts or chains surround the baling chamber or by a separate feeding means and reaches the table 24. The table 24 with the bale 22 is then slid into the wrapping position as shown in FIGS. 1 and 2. Door 18 is then closed and the baling operation resumes. At the same time, the wrapping process starts (step 100), in which the controller 46 controls the drive arrangement 34 to rotate the arms 30 around the vertical axis and the rollers 28 and thus the table 24 to rotate around the horizontal axis. Thus, the bale 22' rotates around its horizontal center axis and the arms 30 with the film dispensers rotate around the vertical axis, such that film 52 is unwound from the film dispensers and wrapped around the bale 22'.

The speed of the arms 30 and of the rollers 28 controlled by controller 46 depends on the signals from the sensors 42 and from the obstacle sensors 48. If in step 102, the sensors 42 indicate that at least one sensing arrangement has left its rest position, possibly due to the fact that an obstacle was touched, the controller 46 instructs the drive arrangement 34 to stop the arms 30 and the rollers 28 (step 104). This can be performed by stopping the hydraulic flow through the hydraulic motor of the drive arrangement by controlling a suitable valve, or by rotating a swash plate of the hydraulic motor of the drive arrangement into a stop position, and if necessary, by activating an additional brake. Thus, once an obstacle like a human being or an animal or a branch of a tree for example, comes into the circumference covered by the arms 30 and the film dispensers 32, their rotation is immediately stopped, such that damage to the film dispensers 32 and harm to the obstacle are avoided.

If the sensors 42 indicate that the sensing arrangement does not detect an obstacle, since bars 40 and rods 42 are in their rest position, the speed of the drive arrangement 34 commanded by the controller 46 depends on the signals from the obstacle sensors 48 (step 106). If the obstacle sensors 48 indicate that an obstacle is within one of their sensitive ranges 50, the controller 46 instructs the driving arrangement 34 to rotate the arms 30 and the rollers 28 with a first speed (step 108). This first speed is the highest possible speed that allows stopping the arms 30 from rotating when the sensors 42 should indicate that the rods 42 have touched an obstacle, without any risk of harm to a human being or damage of the film dispensers 32 (or even without any contact to the obstacle). Thus, it is assured that the sensing arrangement can stop the arms 30 as intended, since an obstacle is present in one or more of the sensitive ranges 50, and there is hence a risk that stopping the arms 30 might be necessary.

On the other hand, if the obstacle sensors 48 indicate that there is no obstacle within the sensitive ranges 50, the controller 46 controls the drive arrangement 34 to drive the rollers 28 and the arms 30 with a second speed, which is faster than the first speed (step 110). In a preferred embodiment, the second speed is twice the first speed. Thus, as long as there is no risk of a collision with an obstacle, the arms 30 rotate with a higher speed, that would not allow halting the arms 30 by the sensing arrangement without damage or contract (but that does not negatively influence the safety, since such a collision is not possible according to the signals from the obstacle sensors 48). The second speed allows a fast wrapping of the bale 22'. After steps 108 and 110, step 102 follows again.

Finally, when the bale 22' is entirely wrapped, the film 52 is separated from the supply on the film dispensers 32 by means of the film holders 36 and the bale 22' is released to the ground, by tilting the table 24 to the rear.

Having described the preferred embodiment, it will become apparent that various modifications can be made without departing from the scope of the invention as defined in the accompanying claims.

The invention claimed is:

1. A method of wrapping a bale, comprising the steps of:
   rotating an arm holding a film dispenser around an axis in a direction of direction and thereby wrapping the film from the film dispenser around the bale;
   stopping rotation of the arm when a sensing arrangement mounted in the direction of rotation ahead of the arm senses an obstacle;
   wherein the arm is driven with a first speed sufficiently slow to prevent the arm and the film dispenser from getting damaged by hitting an obstacle detected by the sensing arrangement when an obstacle sensor observing a sensitive range in the environment of the bale wrapper detects an obstacle, and with a second speed faster than the first speed when the obstacle sensor detects no obstacle.

2. A bale wrapper comprising:
   at least one arm holding a film dispenser;
   a drive arrangement for rotating the arm around an axis in a direction of rotation and thereby wrapping the film from the film dispenser around a bale;
   a sensing arrangement mounted in the direction of rotation ahead of the arm and arranged to stop rotation of the arm when the sensing arrangement senses an obstacle, the drive arrangement being operable to drive the arm with a first speed sufficiently slow to prevent any injury to a human being and the arm and the film dispenser from being damaged by hitting an obstacle detected by the sensing arrangement;
   wherein the wrapper comprises at least one obstacle sensor having a sensitive range in the environment of the bale wrapper and coupled to the drive arrangement in a manner such that the drive arrangement drives the arm with the first speed when the obstacle sensor detects an obstacle and with a second speed faster than the first speed when the obstacle sensor detects no obstacle.

3. A bale wrapper according to claim 2, wherein the obstacle sensor is a distance sensor comprising one of: a microwave sensor; a radar sensor; a scanning laser sensor; an ultrasonic sensor; and an infrared sensor.

4. A bale wrapper according to claim 2, wherein the obstacle sensor comprises a camera and an image processing system.

5. A bale wrapper according to claim 2, wherein the at least one obstacle sensor is provided on the sides and the rear of the bale wrapper.

6. A bale wrapper according to claim 2, wherein the bale wrapper further comprises a table supporting the bale, the table being movable to rotate the bale around a horizontal axis, while the arm rotates around a vertical axis.

* * * * *